D. E. COTA.
PACKING.
APPLICATION FILED JUNE 17, 1913.
1,079,976.
Patented Dec. 2, 1913.
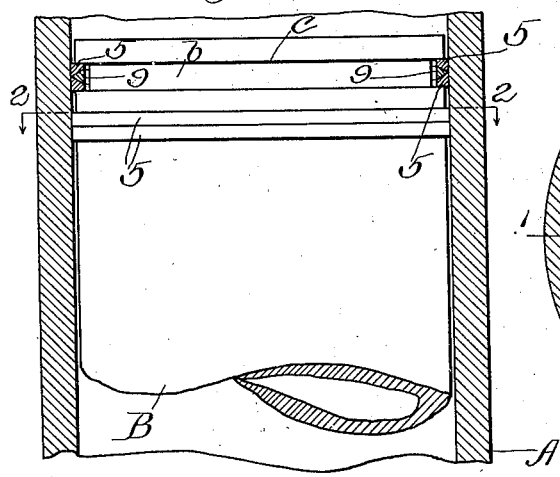
Fig. 1.
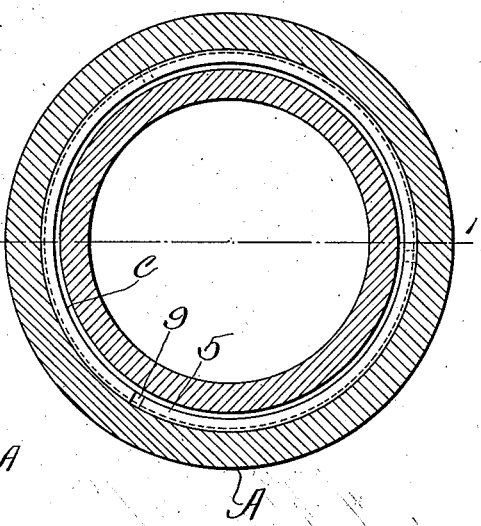
Fig. 2.
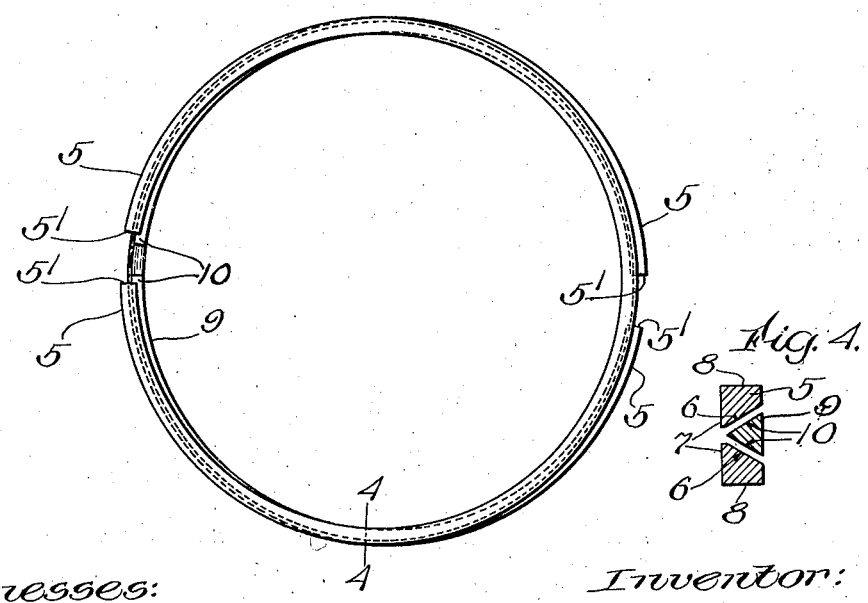
Fig. 3.
Fig. 4.
Witnesses:
Alfred H. McGlinchey.
E. C. Murphy.
Inventor:
Daniel E. Cota
By Henry J. Miller
atty.

UNITED STATES PATENT OFFICE.

DANIEL E. COTA, OF BOSTON, MASSACHUSETTS, ASSIGNOR OF ONE-HALF TO HIMSELF AND ONE-HALF TO JACOB FISCHER, OF BOSTON, MASSACHUSETTS.

PACKING.

1,079,976.  Specification of Letters Patent.  Patented Dec. 2, 1913.

Original application filed August 11, 1909, Serial No. 512,340. Divided and this application filed June 17, 1913. Serial No. 774,130.

*To all whom it may concern:*

Be it known that I, DANIEL E. COTA, of Boston, in the county of Suffolk and State of Massachusetts, have invented certain new and useful Improvements in Packing, of which the following is a specification, reference being had to the accompanying drawings, forming part thereof.

This invention has reference to improvements in packing and particularly for packing adapted for use in packing spaces between pairs of cylindrical members.

The object of the invention is to so construct packing comprising a series of rings that when said rings are applied to a piston slidable within a cylindrical wall the compressive action of said wall on certain of said rings tends to effect, through the coöperation of the combination of rings, the spreading of said ring members in the direction of the movement of said piston.

Other objects of the invention will appear from the following description.

The invention consists in the packing hereinafter described and claimed.

Figure 1, represents a sectional view as taken on line 1—1, Fig. 2, of a cylinder with the improved packing carried by a piston in said cylinder. Fig. 2, represents a cross sectional view taken on line 2—2 Fig. 1. Fig. 3, represents an enlarged plan view of the series of rings which are combined to form the packing. Fig. 4, represents a sectional view taken on line 4—4 Fig. 3, the packing members being slightly separated.

Similar reference characters designate corresponding parts throughout.

In carrying this invention into practice my main object is to provide packing for a cylinder and a piston operating in said cylinder and having an annular groove in which the packing is adapted to be received whereby certain of the packing members, held under compression by the wall of the cylinder, will be spread apart sufficiently to contact with the end walls of said groove or so that the packing will fill the width of the groove preferably without contacting with the back wall of said groove whereby an annular space is left between the packing members and said back wall of said groove which space is unobstructed. It is however evident that this invention is not necessarily limited to such structure in its more specific form.

As shown in the drawings A indicates a cylindrical wall, of any kind, and B a piston slidably mounted in the bore of said wall and having one or more annular grooves, having the back wall $b$ and the end walls $c, c$ which, preferably, extend in planes at right angles to the axis of said piston B. In applying packing to said piston grooves or packing receptacles it is of course desirable that the packing, particularly metallic packing, should contact with the walls $c, c$ of said grooves so that there will be no lost motion between the packing and said walls whereby, during the operation of the piston B. said piston might operate relatively to its packing to a limited degree. It is also evident that the packing should yield and automatically accommodate itself to the walls or parts on which it acts and preferably such accommodation should result from some structural shape or quality inherent in the packing itself rather than because of the addition to the packing members of complicated devices.

This improved packing, in its preferred form, comprises a pair of metallic eccentric and inherently resilient open rings 5, 5 having the inner bevel walls 6, 6, the peripheral bearing walls 7, 7 and the end walls 8, 8, the eccentric extension of said rings from their axes being preferably greatest at their open ends 5', 5'. In order to effect the spreading apart of said rings 5, 5 when the eccentric portions thereof are compressed I prefer to utilize the open spreader ring 9 which extends eccentrically to its axis and preferably is inherently resilient. This ring 9 is located somewhat between the packing rings or members 5, 5 and has the peripheral bevel walls 10, 10 which, when the rings or members 5, 5 are compressed thereagainst, coöperate with the bevel walls 6, 6, of said rings 5, 5 to effect the spreading apart of said rings so that the walls 8, 8 thereof may contact with the walls $c, c$ of the groove $b$ in which said packing is located.

The rings or packing members 5, 5 and 9 may be manufactured from rod or wire stock metal of suitable cross sectional size and shape at comparatively a low cost and may be readily applied to a piston having a groove similar to groove b—c without changing the construction of said piston or its groove in any particular. In the application of said rings they are simply sprung open sufficiently to permit of their passage over the end of the piston and, when in place, said rings are compressed sufficiently to permit them to enter the cylinder with the piston. As said rings are held, by the wall of the cylinder, concentric with the axis of the piston they are spaced from the wall b of their receiving groove.

Having thus described my invention I claim as new and desire to secure by Letters Patent—

1. Packing comprising a pair of open metallic eccentric and inherently resilient rings beveled at their inner surfaces, and a bevel spreader ring adapted to be located between the beveled surfaces of said packing rings to exert a spreading action thereon under compression of said packing rings.

2. Packing comprising an open metallic eccentric and inherently resilient spreader ring having bevel edges, and a pair of packing rings between which said spreader ring is adapted to be received.

3. Packing comprising a series of open metallic eccentric and resilient rings having complemental bevel surfaces, whereby one of said rings under compression acts to move another of said rings in a direction approximately parallel to its axis.

4. Packing comprising a pair of open metallic eccentric and resilient rings having their inner surfaces beveled, and a third open metallic eccentric and resilient ring having a V-shaped periphery adapted to be located between the beveled surfaces of said pair of rings.

5. Packing comprising a pair of flat open eccentric and inherently resilient rings having backs beveled from their meeting edges to form a groove, the meeting plane of said edges being transverse to the axis of said rings, and an open eccentric and inherently resilient bevel spreader ring located in said groove and adapted solely through its inherent resistance to resist the compression of said packing rings and inherently to act to separate said rings under compression thereof.

DANIEL E. COTA.

Witnesses:
HENRY J. MILLER,
ESTHER C. MURPHY.